J. Schermerhorn.
Vegetable Gatherer
Nº 91,046.  Patented Jun. 8, 1869.

United States Patent Office.

JACOB SCHERMERHORN, OF DAYSVILLE, NEW YORK.

Letters Patent No. 91,046, dated June 8, 1869.

IMPROVEMENT IN VEGETABLE-GATHERER.

The Schedule referred to in these Letters Patent and making part of the same.

*To all whom it may concern:*

Be it known that I, JACOB SCHERMERHORN, of Daysville, Oswego county, New York, have invented a new and improved Vegetable-Gatherer; and I do hereby declare that the following is a full, clear, and exact description thereof, which will enable others skilled in the art to make and use the same, reference being had to the accompanying drawings, forming part of this specification.

This invention relates to improvements in apparatus for gathering vegetables and fruit, such as potatoes, apples, &c., when lying on the ground.

It consists in a rake or comb, having long curved metallic fingers suspended from the front of a pair of handles, supported on an axle and wheels, and provided with a pocket, so arranged that the operator pushing the machine in advance, may cause the fingers to run along the ground, under the articles to be gathered, which will, by depressing the handles below the level of the axle, freely roll down over a riddle into the pocket, said riddle being arranged between the fingers and the pocket, for separating small articles and other matter liable to be taken up.

Similar letters of reference indicate corresponding parts.

Figure 1:
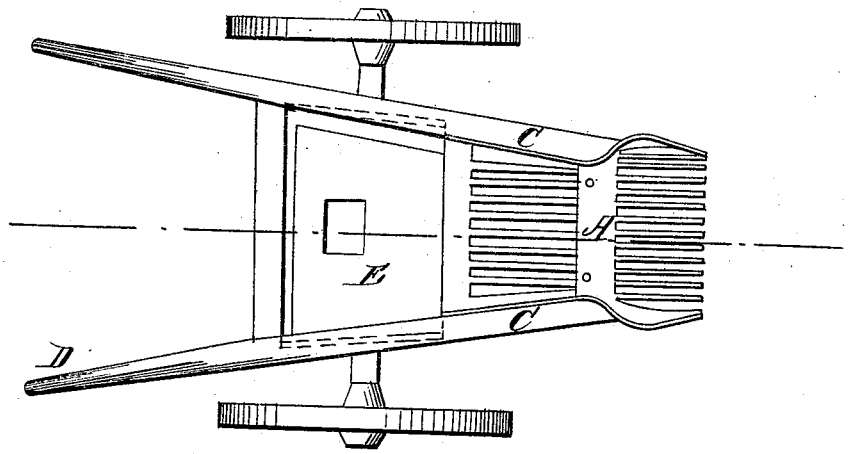
Figure 1 represents a plan view of my improved machine.
Figure 2:
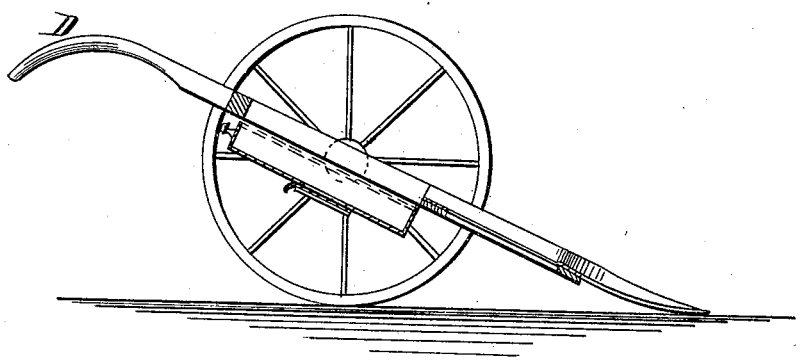
Figure 2 represents a longitudinal sectional elevation of the same.

A represents a comb or rake, the teeth of which are preferably curved, to adapt them to run along the ground, suspended from the ends of the arms C, which are suspended upon an axle having a pair of wheels.

These arms terminate in handles D, and a box or pocket, E, is suspended from them, into which the articles to be gathered will freely pass, by depressing the handles D below the level of the axle, thereby forming an incline forward of the axle.

A riddle, E, is provided between the rake and the pocket, over which the articles descend in passing to the pocket, to separate pebbles, dirt, and other matter liable to be taken up.

The machine is operated by pushing it along, and guiding the rake-fingers, so as to glide over the surface, and pass under such articles as potatoes and other vegetable roots, which have been previously dug and scattered on the ground, which are now commonly gathered by hand.

When the comb or rake is filled, by depressing the handles behind the axle, below the level of the same, the arms forward of the axle, to which the riddle and rake are attached, are thereby elevated, and the articles gathered on the rake pass down the decline, over the riddle, to the box or pocket.

A passage closed by a gate is provided in the bottom of the box, through which the articles gathered may be delivered.

When the box has been filled the machine may be readily wheeled away, to deliver the articles where required.

Having thus described my invention,

I claim as new, and desire to secure by Letters Patent—

The vegetable gatherer, consisting of the arms C D, supported upon the axle and wheels, and provided with the curved rake A, the riddle, and the box, having a discharge-opening in its bottom, all arranged and operating as described, for the purpose specified.

JACOB SCHERMERHORN.

Witnesses:
CHAS. H. CROSS,
A. H. CROSS.